United States Patent
Koehler et al.

(10) Patent No.: US 12,458,309 B2
(45) Date of Patent: Nov. 4, 2025

(54) METHOD FOR IMPROVING CT-BASED MATERIAL DECOMPOSITION

(71) Applicant: KONINKLIJKE PHILIPS N.V., Eindhoven (NL)

(72) Inventors: Thomas Koehler, Norderstedt (DE); Roland Proksa, Neu Wulmstorf (DE); Kevin Martin Brown, Chardon, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 338 days.

(21) Appl. No.: 18/038,746

(22) PCT Filed: Dec. 2, 2021

(86) PCT No.: PCT/EP2021/083855
§ 371 (c)(1),
(2) Date: May 25, 2023

(87) PCT Pub. No.: WO2022/117690
PCT Pub. Date: Jun. 9, 2022

(65) Prior Publication Data
US 2024/0000411 A1 Jan. 4, 2024

Related U.S. Application Data

(60) Provisional application No. 63/121,278, filed on Dec. 4, 2020.

(30) Foreign Application Priority Data

Apr. 23, 2021 (EP) .................................... 21170161

(51) Int. Cl.
*A61B 6/00* (2024.01)
*A61B 6/03* (2006.01)
*A61B 6/46* (2024.01)

(52) U.S. Cl.
CPC .............. *A61B 6/482* (2013.01); *A61B 6/032* (2013.01); *A61B 6/467* (2013.01); *A61B 6/5205* (2013.01)

(58) Field of Classification Search
CPC .. A61B 5/00; A61B 6/03; A61B 6/032; A61B 6/037; A61B 6/48; A61B 6/482;
(Continued)

(56) References Cited

U.S. PATENT DOCUMENTS 7,734,076 B2   6/2010   Du
2010/0040192 A1   2/2010   Zhang
(Continued)

FOREIGN PATENT DOCUMENTS

WO   WO-2019237179 A1 * 12/2019   .............. A61B 6/482

OTHER PUBLICATIONS

PCT International Search Report, International application No. PCT/EP2021/083855, Mar. 25, 2022.
(Continued)

*Primary Examiner* — Don K Wong
(74) *Attorney, Agent, or Firm* — Larry Liberchuk

(57) ABSTRACT

A method for use in a material decomposition procedure applied to dual-energy CT projection data. Material decomposition is often done using pre-computed lookup tables (LUTs) for mapping input projection data, acquired with particular X-ray source parameters, to material data values. However, the X-ray source parameters can vary over the course of a scan, making the results inaccurate. Embodiments are based on determining in advance a plurality of sets of basis LUTs for each of a plurality of different possible ranges of values over which the X-ray source parameter may vary during a scan. The basis LUTs in each set are devised as being LUTs which represent the majority contribution to the overall material decomposition function for the time-
(Continued)

varying energy spectrum. When performing a material decomposition procedure, an appropriate set of the basis LUTs is chosen, based on an identified range of variation of the X-ray source parameter during the scan, and a linear combination of the basis LUTs is defined, using weightings which depend upon instantaneous values of the X-ray source parameter during the scan period.

9 Claims, 4 Drawing Sheets

(58) Field of Classification Search
CPC ......... A61B 6/488; A61B 6/52; A61B 6/5211;
A61B 6/5294; G06T 7/30; G06T 7/32;
G06T 7/97; G06T 11/005; G06T 11/008;
G06T 2201/00; G06T 2207/10072; G06T
2207/10081; G06T 2207/10116; G01N
9/02; G01N 9/00; G01N 23/00; G01N
23/02; G01N 33/0003; G01N 33/00
See application file for complete search history.

(56) References Cited

U.S. PATENT DOCUMENTS

2011/0249788 A1   10/2011   Nuesch
2013/0251220 A1    9/2013   Kraft

OTHER PUBLICATIONS

Weaver J.B. et al., "Attenuation Coefficients of Body Tissues Using Principal-Components Analysis", Medical Physics, vol. 12, vol. 1, pp. 40-45, Jan. 1985.

Fuchs M. et al., "Improving Source Reconstructions by Combining Bioelectric and Biomagnetic Data", Electroencephalography and Clinical Neurophysiology, vol. 107, Issue 2, 1998, pp. 93-111.

Daubechies I. et al., "Iteratively Reweighted Least Squares Minimization for Sparse Recovery", Communications on Pure and Applied Mathematics, vol. 63, Issue 1, pp. 1-38, 2010.

* cited by examiner

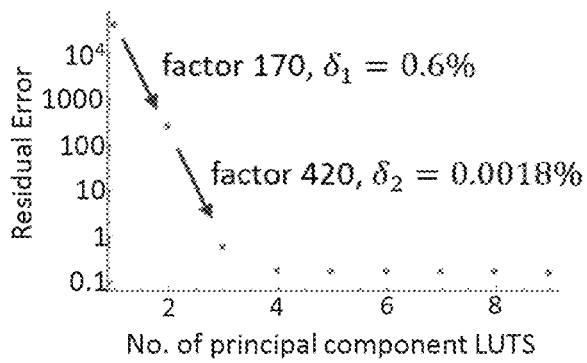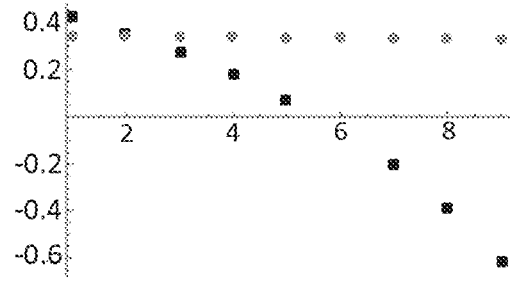
FIG. 2
FIG. 3

METHOD FOR IMPROVING CT-BASED MATERIAL DECOMPOSITION

FIELD OF THE INVENTION

The present invention relates to a method for use in a material decomposition procedure applied to CT scan data, in particular to dual energy CT scan data.

BACKGROUND OF THE INVENTION

A computed tomography (CT) scanner includes an X-ray radiation generator mounted on a rotatable gantry opposite one or more detectors. The X-ray generator rotates around an examination region located between the X-ray generator and the one or more detectors and emits (typically polychromatic) radiation that traverses the examination region and a subject and/or object disposed in the examination region. The one or more detectors detect radiation that traverses the examination region and generate a signal (or projection data) indicative of the examination region and the subject and/or object disposed therein. The projection data refers to the detector data.

Within the field of CT imaging technology, two varieties of CT imaging can be distinguished: spectral CT imaging and non-spectral CT imaging.

A non-spectral computed tomography (CT) scanner generally includes an X-ray tube mounted on the rotatable gantry opposite one or more rows of detectors. The X-ray tube rotates around the examination region and emits broadband radiation that traverses the examination region. A key parameter is the peak kilovoltage (kVp), which is the maximum voltage applied across the X-ray tube during generation of X-rays.

For example, with a peak (maximum) tube voltage of 120 kV (i.e. 120 kVp), the energy spectrum of the emitted radiation (with filtering of low energy photons) may be from 40 keV to 120 keV. The one or more rows of detectors detect radiation that traverses the examination region and generate projection data (line integrals) indicative thereof. The projection data is reconstructed to generate volumetric image data.

The voxels of the reconstructed volumetric image data are typically displayed using gray scale values corresponding to relative radiodensity. The gray scale values reflect the attenuation characteristics of the scanned subject and generally show structures such as anatomical structures within the scanned subject. Since the attenuation of a photon by a material is dependent on the energy of the photon traversing the material, the detected radiation also includes spectral information, which provides additional information indicative of the elemental or material composition (e.g., atomic number) of the scanned material of the subject. However, the values of the projection data are proportional to the energy fluence integrated over the energy spectrum (e.g., 40 keV to 120 keV), and the volumetric image data does not reflect the energy dependent information.

A spectral (multi-energy) CT scanner is configured to generate projection data at multiple different spectra. Multiple measurements with different spectra enable obtaining information about the energy dependent attenuation of the X-ray. This is known as spectral X-ray imaging. Spectral X-ray data allows for discerning and quantifying materials comprised by the scanned object.

One of the methods for performing spectral imaging is kVp switching, in which a tube voltage is cyclically switched between or through at least two different tube voltages. A single X-ray tube may be switched through different operating peak voltages, or two or more X-ray tubes may be used, configured to emit radiation having different mean spectra, and sequentially driven.

By way of example, in a dual-energy configuration, a first voltage (e.g., a lower kVp) is applied to the X-ray tube for a first integration period, a second voltage (e.g., a higher kVp) is applied to the X-ray tube for a second integration period, the first voltage is applied to the X-ray tube for a third integration period, the second voltage is applied to the X-ray tube for a fourth integration period, and so on.

The lower and higher kV projection (i.e. attenuation) data can be decomposed, e.g., into attenuation by the photoelectric effect and by Compton scattering, which may then be individually reconstructed and then combined to produce virtual monoenergetic volumetric image data.

Spectral CT data, and in particular dual energy (e.g. kVp switching) data can be used to derive material information about a scanned object by means of so-called material decomposition. Material decomposition is possible because there exist two primary attenuation phenomena in the diagnostic X-ray energy range: Compton scattering and photoelectric absorption, and wherein the material-dependent attenuation coefficients for each vary differently with respect to the X-ray energy that is used. By irradiating an object with at least two different energies, it is thus possible to decompose the material properties of the object.

Material decomposition is a computationally demanding procedure and, for this reason, it is usually handled using a pre-computed lookup table (LUT) for mapping obtained CT projection data values to material decomposed data values. However, a problem with this approach is that, in practice, the actual spectrum of the X-ray radiation during a scan can vary in dependence upon a number of scan parameters which are sometimes difficult to robustly control. For example, voltage ripple can occur, or the tube current may be deliberately modulated as part of dose modulation. If the current or voltage changes, the properties of the X-ray spectrum change. In this scenario, the standard approach of pre-computing a respective LUT for every possible spectrum becomes infeasible.

Thus, improvements in the field would be of value, in particular capable of ameliorating the problem of varying X-ray source energy properties when acquiring dual-energy (e.g. kVp-switching) scan data used for a material decomposition, but without significantly increasing the computational complexity of the material decomposition process.

US2011/0249788A1 discloses a method for identifying the elemental composition of an object by selecting an energy range of an irradiation energy range according to at least one energy-selection criterion to obtain a selected energy range, selecting, according to at least one element-selection criterion, pure elements and/or compounds for which analysis of said object is performed, to obtain selected elements, determining the absorption coefficient for the selected pure elements and/or compounds according to the selected energy range, and determining the integrated density of the selected pure elements and/or compounds.

SUMMARY OF THE INVENTION

The invention is defined by the claims.

According to examples in accordance with an aspect of the invention, there is provided a method for use in a material decomposition procedure for application to a set of dual-energy CT projection data acquired over a CT scan period, the method comprising:

obtaining an indication of a variation range of a defined X-ray source parameter over the course of the CT scan period;

accessing a datastore storing one or more of sets of first lookup tables (LUTs), each first LUT defining a mapping from CT projection data values to corresponding material data values, and each respective set associated in the datastore with a particular variation range of the X-ray source parameter;

performing a selection procedure comprising selecting a set of the LUTs in the datastore, wherein the selection is determined based on the obtained range for the X-ray source parameter;

defining a linear combination of the first LUTs selected in the selection procedure, the weightings for each of the LUTs in the linear combination being dependent at least in part on instantaneous values of the X-ray source parameter over the course of the scan, the linear combination for application to the CT projection data set for performing a material decomposition procedure;

generating a data output representative of the defined linear combination.

The X-ray source parameter referred to above may for example be an X-ray tube current, an X-ray dose, or tube voltage for example.

The generated data output is indicative of the selected LUTs, and the coefficients or weightings for the LUTs in the linear combination. Thus, the output of the method in a simplest embodiment may be simply a representation of the determined linear combination of LUTs which should be applied to input dual-energy CT projection data in order to derive the material data.

Embodiments of the present invention are based on the realization of the inventors that the spectrum change during acquisition of scan data can be compensated for in the material decomposition process by using a linear combination of two (or more) lookup tables (LUTs) to improve the decomposition accuracy. In particular, the inventors have made the surprising discovery that the correct LUT for scan data acquired with a varying X-ray source energy parameter can be well approximated by a linear combination of just two LUTs. This was discovered by applying a principal component analysis (PCA) to a series of LUTs which are configured for mapping projection data acquired at fixed values of a relevant X-ray source parameter, where the series of input LUTs span the complete range of values over which the parameter is estimated to vary during acquisition of the dataset. The PCA revealed that the root mean square error associated with a linear combination of just two principle component LUTs derived from the PCA procedure was almost two orders of magnitude lower than use of just a single principle component LUT.

Thus, in embodiments of the invention, the datastore stores a set of pre-computed basis LUTs, which represent the best basis LUTs for use in linear combinations for different ranges of the X-ray source parameter. These are for example different principal component LUTs derived in advance by applying a PCA procedure to different series of single-energy LUTs spanning different ranges of the X-ray source parameter. The selection procedure comprises selecting a respective set of these basis LUTs based on the range over which the X-ray source parameter varies during the scan. The datastore may further include appropriate weightings for the two LUTs.

Although a linear combination of two LUTs is referred to above, a linear combination of more than two can be used in further examples.

In accordance with one or more embodiments, the method may further comprise: receiving input dual-energy CT projection data; and performing a material decomposition procedure comprising application of said linear combination of LUTs to the received projection data.

In this set of embodiments, the method further comprises the step of actually deriving the material data by applying the determined linear combination of LUTs, with the determined weightings, to a set of input dual-energy CT projection data. Preferably, this is done by separately applying each of the selected LUTs forming the linear combination to the input CT projection data, and then combining the results with the defined weightings (or coefficients) of each of the LUTs. This is computationally the least demanding. However, it is an alternative option to combine the LUTs first into a single composite LUT based on their respective weightings, and then apply the composite LUT to the input CT data.

This process may further comprise computing the weightings in dependence upon instantaneous values of the X-ray source parameter at each acquisition time point of the projection data sequence.

In accordance with one or more embodiments, the LUTs in the datastore are based on a pre-computed principal component analysis (PCA) procedure applied to one or more sets of further LUTs, each further LUT for mapping CT projection data values acquired with a different respective fixed value of the X-ray source parameter to corresponding material data values, and each of the one or more sets comprising further LUTs spanning different respective ranges of values of the X-ray source.

Thus, the LUTs in the datastore may be pre-computed principal component LUTs derived from prior application of a PCA procedure. In this case, the datastore essentially provides a set of basis LUTs which have been determined in advance from a PCA procedure as those being best for each of a set of one or more different ranges of the X-ray source parameter.

In some embodiments, the datastore may further store a respective weighting function associated with each first LUT, the weighting function defining the weighting coefficient to apply to the LUT in any linear combination, and the weighting function being dependent upon an instantaneous value of the X-ray source parameter at a given time point in the scan period.

In some examples, each weighting function may represents a further output of the same PCA procedure of which the corresponding LUT in the datastore is an output.

In accordance with one or more embodiments, the defined linear combination comprises a first and second set of weighting coefficients applied to each of the two LUTs forming the linear combination, wherein the first set of weighting coefficients is dependent upon the X-ray source parameter values, and the second set of weighting coefficients are determined based on a further input.

The second set of weighting coefficients allow for dedicated pre-weighting of the LUTs. This can be used to put more weight on certain parts of the CT X-ray source parameter range, e.g. parts which are used "more often" than others in clinical routine. The second set of weighting coefficients may for example be determined using an algorithm, they may be pre-stored in a memory, or they may be set based on a user input.

A further aspect of the invention provides a method of generating a dataset for use in a material decomposition procedure, the material decomposition for application to a set of input dual-energy CT projection data acquired over a scan period. The material decomposition procedure is a method which comprises applying a linear combination of at least two LUTs to CT projection data values to obtain material data values. The method itself is for generating a dataset of basis LUTs for use in forming said linear combinations.

The method comprises:

accessing a further datastore storing a set of further LUTs, each defining a mapping from CT projection data values to corresponding material data values, and wherein each of the plurality of further LUTs in the datastore is configured for mapping projection data acquired with a different respective fixed value of said defined X-ray source parameter;

performing, for each of one or more different ranges of said X-ray source parameter, a principal component analysis (PCA) procedure, wherein the inputs to the PCA are an identified subset of the further LUTs in the further datastore configured for X-ray source parameter values which fall within the respective range of values, and the PCA configured to provide an output of two or more principal component LUTs, and generating a dataset comprising a record of each of the derived one or more sets of principal component LUTs, and the associated range of values of the X-ray source parameter to which it corresponds.

This aspect of the invention provides a method for pre-computing appropriate pairs of material decomposition LUTs to be used in the linear combinations for different possible ranges of the X-ray source parameter. The dataset generated by this method can be consulted as part of the main method set out above.

In advantageous examples, the PCA procedure may be configured to provide an output of exactly two principal component LUTs. The reduction in residual error when moving from one principal component LUT to two is nearly two orders of magnitude, whereas the move from two to three LUTs represents only a very modest further reduction in residual error.

In advantageous embodiments, the PCA procedure is further configured to output a respective weighting function associated with each of the principle component LUTs, the weighting function defining the weighting coefficient to apply to the LUT in any linear combination. The weighting function may be dependent upon an instantaneous value of the X-ray source parameter at a given time point in the scan period.

A further aspect of the invention also provides a method comprising a combination of the above method, and the method according to claim 1. These may be performed in sequence, with the method for generating the lookup table performed as a set-up phase, in advance of the material decomposition method of claim 1.

Examples in accordance with a further aspect of the invention provide a computer program product comprising computer program code, the computer program code being executable on a processor or computer, wherein the code is configured to cause the processor to perform a method in accordance with any example or embodiment outlined above or described below, or in accordance with any claim of this application.

Examples in accordance with a further aspect of the invention provide a processing arrangement for use in a material decomposition procedure for application to a set of dual-energy CT projection data acquired over a scan period, the processing arrangement adapted to:

obtain an indication of a variation range of a defined X-ray source parameter over the course of the CT scan period;

access a datastore storing a one or more of sets of first lookup tables (LUTs), each first LUT defining a mapping from CT projection data values to corresponding material data values, and each respective set associated in the datastore with a particular variation range of the X-ray source parameter;

perform a selection procedure comprising selecting a set of the LUTs in the datastore, wherein the selection is determined based on the obtained range for the X-ray source parameter;

define a linear combination of the first LUTs selected in the selection procedure, the weightings for each of the LUTs in the linear combination being dependent at least in part on instantaneous values of the X-ray source parameter over the scan period, the linear combination for application to the CT projection data set for performing a material decomposition procedure; and generate a data output indicative of the defined linear combination.

In some examples, the processing arrangement may comprise the datastore.

The processing arrangement may be further adapted to perform the material decomposition by: receiving a set of dual-energy CT projection data as an input; and performing a material decomposition procedure comprising application of said linear combination of LUTs to the received projection data.

The LUTs in the datastore may be based on results of a principal component analysis (PCA) procedure applied in advance to one or more sets of further LUTs, each further LUT for mapping CT projection data values acquired with a respective fixed value of the X-ray source parameter to corresponding material data values, and the one or more sets comprising further LUTs spanning different respective ranges of values of the X-ray source parameter.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying schematic drawings, in which:

FIG. 2 shows the comparative residual error from using different numbers of principal component LUTs;

FIG. 3 illustrates weighting coefficients derived from a PCA procedure for use in combining basis LUTs derived from the PCA procedure;

DETAILED DESCRIPTION OF THE EMBODIMENTS

Figure 1:
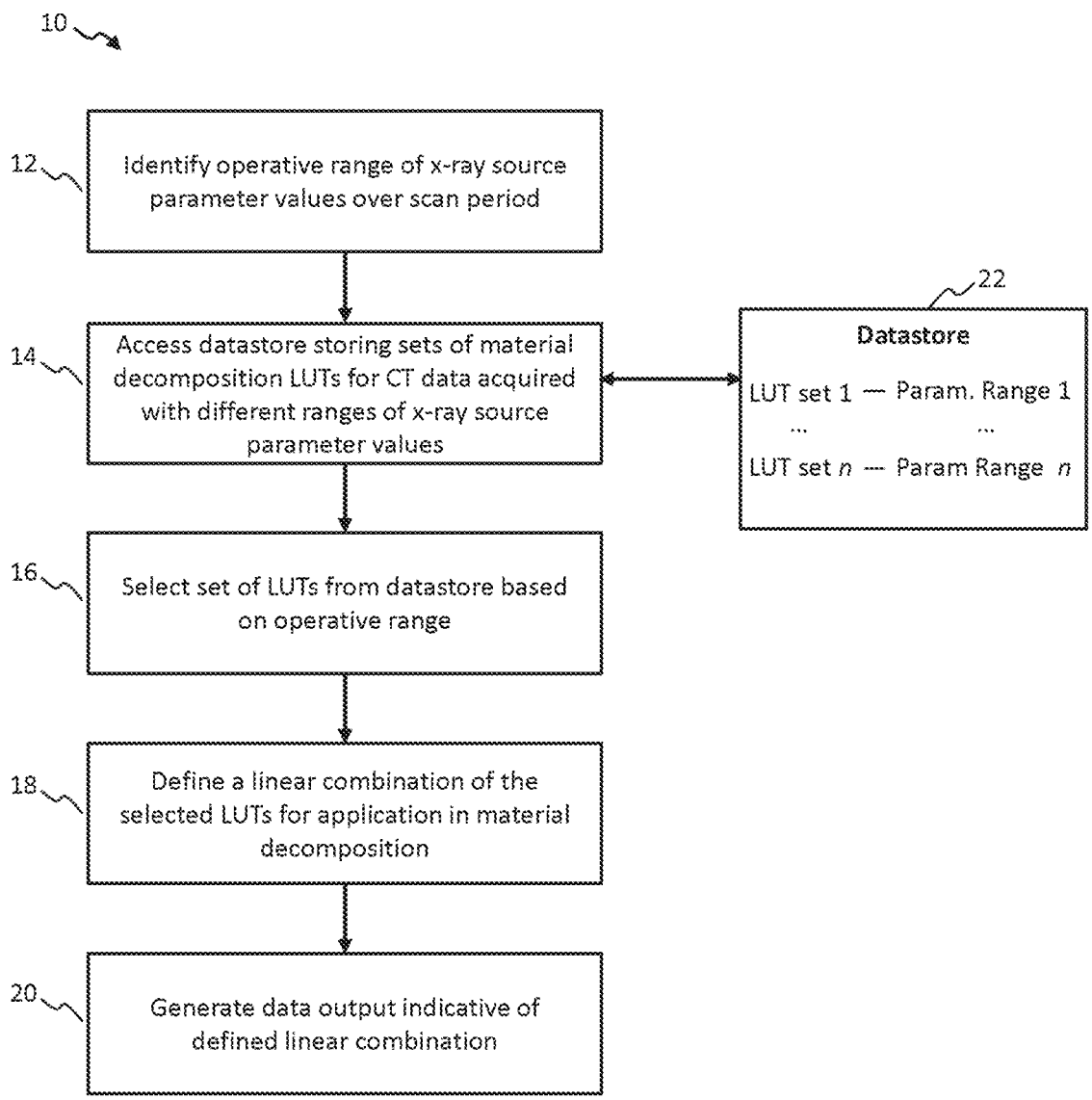
FIG. 1 is a block diagram of steps of an example method according to one aspect of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, the claims, and accompanying drawings. It should be understood that the Figures are merely schematic and are not drawn to scale. It should also be understood that the same reference numerals are used throughout the Figures to indicate the same or similar parts.

The invention provides a method for use in a material decomposition procedure applied to dual-energy CT projection data. Material decomposition is often done using pre-computed lookup tables (LUTs) for mapping input attenuation projection data, acquired with particular X-ray source parameters, to material data values. However, the X-ray source parameters can vary over the course of a scan, making the results inaccurate. Embodiments are based on determining in advance a plurality of sets of basis LUTs for each of a plurality of different possible ranges of values over which the X-ray source parameter may vary during a scan. The basis LUTs in each set are devised as being LUTs which represent the majority contribution to the overall material decomposition function for the time-varying energy spectrum. When performing a material decomposition procedure, an appropriate set of the basis LUTs is chosen, based on an identified range of variation of the X-ray source parameter during the scan, and a linear combination of the basis LUTs is defined, using weightings which depend upon instantaneous values of the X-ray source parameter during the scan period.

To perform a material decomposition from first principles typically involves using a forward model which models the expected photon counts in different photon energy windows (bins) or expected integrated photon energies for different acquisition parameters such as kVp at each pixel of the X-ray detector as a function of a certain set (basis) of materials and their respective equivalent path lengths in the scanned material. This is based on modelling the scanned object as a composition of two or more base materials (such as pure photo-electric and a pure Compton material) and based on a model of the CT system—in particular its source spectrum and its energy-dependent detector response. To decompose the projection data of an object, this forward model can be inverted to determine the material path lengths of each of the basis materials based on the spectral (i.e. multi-energy) projection data. This is a computationally demanding process, and hence, for a known source X-ray energy spectrum, the calculations for different X-ray detector measurements (projection data) can be computed in advance and the results stored in a simple Lookup Table (LUT) which permits straightforward mapping from a set of input X-ray projection data values to a set of material values. The material values may for example be material paths lengths for two or more different basis materials, or path lengths for scatter and photoelectric effect contributions to material attenuation. This will be explained in greater detail to follow.

However, as discussed, the parameters of the energy output of the X-ray source (e.g. X-ray tube) can vary over the course of a data acquisition window, and thus a LUT which has been pre-computed for a single X-ray source energy spectrum will no longer be fully accurate. Reference to the X-ray source parameter in this context means for example a parameter of the X-ray source energy spectrum. In some examples it may represent X-ray dose. In some examples, it may represent X-ray tube current. The variation can arise due to natural random fluctuations but can often also vary due to deliberate modulations. For example, some CT scanning protocols perform dose modulation, wherein the current of the X-ray tube is varied, either to reduce to overall radiation dose to the subject, or to maintain image quality by varying the current dependent upon the signal-to-noise ratio to maintain constant signal to noise ratio.

Due to the variation of the source parameter, to perfectly map the input CT projection data values to material data would require a dedicated LUT for each and every possible X-ray spectrum, through all possible variations as a function of time. In practice, this is not feasible.

The solution proposed by embodiments of this invention is based on the insight that the spectral changes of the X-ray source during an X-ray CT scan using a dual-kV (e.g. kVp switching) protocol can be well represented using a linear combination of only a few basis spectra. This provides for the possibility of approximating a full material decomposition function (represented by an LUT) for a particular set of projection data, acquired with a particular X-ray spectrum variation, with a linear combination of just a few (e.g. two) basis functions (basis LUTs). The basis LUTs which are most appropriate will typically depend on the total range over which the relevant X-ray source parameter varies in the course of the data acquisition. The weightings for the basis LUTs in the linear combination may depend upon the real-time value of the X-ray source parameter at a given time in the scan. In other words, for a whole projection data stream (covering a data acquisition window) for which the X-ray source parameter stays at all times within a defined range of variation, a same common set of basis LUTs may be used for the linear combination, but wherein the particular weightings applied to those basis LUTs in the linear combination at a given time point during the scan is determined based on the value of the parameter at that given time.

By way of illustration, a case may be considered in which the X-ray source energy spectrum changes due to tube-current modulation. Material decomposition can be written in general as:

$$m_s(p_h, p_l, c) = F_s(p_h, p_l, c)$$

$$m_p(p_h, p_l, c) = F_p(p_h, p_l, c)$$

where $p_h$, $p_l$ refer to the X-ray detector readings or measurements at the high and low tube voltage levels (kV) of the particular kVp-switching protocol. These values thus correspond to the projection data values in this example. They may correspond to the raw detector readings, or they may be the readings following one or more pre-processing steps to 'clean' the data. For example, the raw data may be corrected for different detector gains, cross-talk between pixels, off-focal radiation, scatter radiation and various other factors. Optionally, some noise reduction may also be performed before material decomposition.

The values $m_s$, $m_p$ refer to the desired material data values. In this example, two values are obtained related respectively to the photoelectric effect and Compton scatter contributions to the attenuation (see discussion above). More particularly, these values may refer to the line integrals for each of the Compton scatter and photoelectric effect. This means the effective path length through the scanned object of the relevant contribution factor, optionally further multiplied by the attenuation coefficient. By way of further explanation, X-ray attenuation by an object (in the absence of materials with a k-edge in the relevant spectrum) is a combination of photo-electric absorption and scattering (dominantly Compton, but also in part Rayleigh). As will be known by the skilled person in the art, a process of material decomposition can refer to, in a more basic form, simply the separation of the observed attenuation into pure photoelectric and pure scatter contributions. This is based on a model representation of the object as comprising (hypothetical) materials which have only one of the attenuation mechanisms. Conceptually, for decomposing the object, there is simply a need for two components which attenuate differently. Material decomposition into scatter and photoelectric contributions can be useful for various subsequent computations. In other examples however, the obtained material data values may instead be values relating to each of two or more basis materials (e.g. water and calcium, water and iodine, Teflon and iron, etc.).

The value c refers to the X-ray source parameter, e.g. the tube current.

The values $F_s$, $F_p$ represent the decomposition function that is currently pre-computed and represented in LUTs. The concept according to embodiments of the present invention is to approximate the decomposition by a linear combination of two pre-computed functions. For each of the scatter and photoelectric contributions, this may be written for example as $$m_s(p_h, p_l, c) = a_1(c) F_{s,1}(p_h, p_l) + a_2(c) F_{s,2}(p_h, p_l)$$

$$m_p(p_h, p_l, c) = b_1(c) F_{p,1}(p_h, p_l) + b_2(c) F_{p,2}(p_h, p_l)$$

The functions $F_{s,1}(p_h, p_l)$, $F_{s,2}(p_h, p_l)$ $F_{p,1}(p_h, p_l)$ $F_{p,2}(p_h, p_l)$ correspond to basis functions. In the context of embodiments of the present invention, the basis functions are represented by basis Lookup Tables (LUTs).

Each of the weighting coefficients $a_1(c)$, $a_2(c)$, $b_1(c)$, $b_2(c)$ are also functions, in this case dependent upon the instantaneous X-ray source parameter value (i.e. the tube current in this example).

FIG. 1 outlines the basic steps of an example method 10 according to a first aspect of the invention. This method relates to a routine or procedure to be performed as part of a material decomposition procedure. The method is primarily intended for application to dual energy CT projection data (e.g. projection data acquired from a kVp-switching CT scan protocol). To take advantage of the insights mentioned above, the method accesses a datastore 22 which stores pre-computed basis lookup tables, which are known to be appropriate for best representing the material decomposition function for different defined ranges of variation of an X-ray source parameter (such as X-ray dose or X-ray current).

The method 10 comprises obtaining 12 an indication of a variation range of a defined X-ray source parameter over which said set of CT projection data was acquired. For example, the relevant CT projection data may be a projection data stream comprising a series of X-ray detector measurements at high and low tube voltages, at different projection angles, for each of a series of time points throughout the scan period. At each time point in the projection data stream, there is a known instantaneous value of the relevant X-ray source parameter (e.g. tube current). Over the whole period covered by the relevant projection data stream (which may be an entire scan, or just a portion of a scan, e.g. a portion relating to a particular slice), the instantaneous value of the X-ray source parameter may vary between an upper value and a lower value, the difference between said upper value and lower value defining a variation range over which the X-ray source parameter varies during the course of the data acquisition (or scan) period. The reference to the range of X-ray source parameter values over which the data was acquired means the range of values over which the X-ray source parameter varied over the course of acquisition of the CT projection data.

The method further comprises accessing a datastore 22 storing one or more sets of first lookup tables (LUTs), each first LUT defining a mapping from CT projection data values to corresponding material data values, and each respective set associated in the datastore with a particular variation range of the X-ray source parameter. With reference to the material data values, we refer to the explanations above which outlined various examples for the type of material data which may be obtained. Others are also possible, as will be known by the skilled person. The first LUTs may be referred to as basis LUTs. They are for forming the basis of linear combinations of LUTs to be used for generating material data values. Each set of the first LUTs corresponds to a particular possible variation range of the X-ray source parameter.

The first LUTs are compiled in a dataset stored on the datastore. The data structure of the dataset can vary. It may comprise a composite lookup table or array, wherein each element of this data structure is populated by the lookup tables forming a respective set, in combination with the relevant range of values of the X-ray source parameter to which it corresponds. In other examples, each LUT may form a separate element in a data structure, such as a table or array, and each comprising a data pointer or reference to a particular range of X-ray source parameter values (where these may be stored in a further table or array) permitting direct lookup of the relevant set of the LUTs, based on a range of the X-ray source parameter.

The dataset of LUTs in the datastore 22 can be queried to retrieve a particular set of LUTs based on a known range of values of the X-ray source parameter.

In a preferred set of embodiments, each set of basis LUTs comprises two LUTs. Each set in this case is a pair of basis LUTs. However, this is not essential, and each set may comprise more than two basis LUTs in further examples.

The method further comprises performing a selection procedure comprising selecting a set of the LUTs in the datastore, wherein the selection is determined based on the obtained indication of the range for the X-ray source parameter.

Where the range of the source parameter for the projection data set matches one of the ranges in the datastore, the selection procedure may comprise simply querying the lookup table with the range, and retrieving the corresponding set of basis LUTs. If the range of values does not match one of the ranges in the table, the selection procedure may comprise for example selecting the set of LUTs for the closest range to the one identified for the projection data, or selecting the two closest sets either side of the identified range.

The method further comprises defining a linear combination of the first LUTs selected in the selection procedure. The weightings for each of the LUTs in the linear combination being dependent upon an instantaneous value of the X-ray source parameter. The resulting linear combination is for application to the CT projection data set for performing a material decomposition procedure.

The method further comprises generating a data output indicative of the defined linear combination.

The weighting coefficients for each of the LUTs in the linear combination may be functions, where the functions may be dependent upon an instantaneous value of the X-ray source parameter. As explained above, the CT projection data may comprise a data stream, covering a data acquisition scan period, and wherein an instantaneous value of the X-ray source parameter is known for each given time point. Thus, when executing the material decomposition, the relevant weightings for the basis LUTs can be computed for each set of projection data values for each data acquisition time point.

If the weightings comprise weighting functions, these may also be stored in the datastore, each weighting function being associated or linked in the datastore to the relevant LUT to which it corresponds.

In some examples, the linear combination comprises a first and second set of weighting coefficients applied to each of the two or more LUTs forming the linear combination, wherein the first set of weighting coefficients is dependent upon an instantaneous value of the X-ray source parameter, and the second set of weighting coefficients is determined based on a further input. The second set of weighting coefficients allow for dedicated pre-weighting of the LUTs. This can be used to put more weight on certain parts of the CT X-ray source parameter range, e.g. parts which are used "more often" than others in clinical routine. In different examples, the second set of weighting coefficients may be determined using an algorithm (so that the further input is provided by the output of the algorithm), they may be pre-stored in a memory, or they may be set based on a user input.

In some embodiments, the method may further comprise executing the material decomposition by receiving input dual-energy CT projection data; and performing a material decomposition procedure comprising application of said linear combination of LUTs to the received projection data.

This process may further comprise computing the weightings in dependence upon instantaneous values of the X-ray source parameter at each acquisition time point of the projection data sequence.

In some examples, the material decomposition may be performed in real time with data acquisition. The projection data may be received in real time as a data stream. The data stream may include a time series of projection data values, each tagged with an indication of an instantaneous value of the X-ray source parameter value during acquisition of the projection data values.

During material decomposition, each of the LUTs of the linear combination may be applied separately to the projection data, and the results subsequently combined according to the weightings specified in the defined linear combination.

In a preferred set of embodiments, the first LUTs (or basis LUTs) stored in the datastore for each range of values of the X-ray source parameter may be pre-determined or pre-computed based on a principal component analysis (PCA) procedure. In particular, the LUTs in the datastore may represent results of a principal component analysis (PCA) procedure applied in advance to one or more sets of further LUTs, each further LUT for mapping CT projection data values acquired with a respective fixed value of the X-ray source parameter to corresponding material data values, and each of the one or more sets of further LUTs including further LUTs spanning a different respective range of values of the X-ray source parameter.

Principal component analysis (PCA) is a mathematical technique which is able to identify one or more linear combinations of a set of input channels or vectors which are statistically uncorrelated with one another. The output is a set of output channels which represent the extracted principal components of which the input channels are each partially formed.

Statistical correlation is a term of the art. In particular, statistical correlation is a well-defined term in the field of mathematical statistics. Two random variables X and Y are statistically uncorrelated if the expected value of their product is equal to the product of their expected values.

By applying PCA to a set of LUTs spanning a series of different X-ray source parameter values over the range of variation of the parameter, there is obtained a reduced set of principal component LUTs which each corresponds to a linear combination of the original single-parameter-value LUTs. When performing the material decomposition, a linear combination of these principal component LUTs can then be used to represent an approximation of the decomposition LUT for the full scan, with time-varying X-ray source parameter value.

Details of a suitable principal component analysis method which may be applied will be immediately recognized by the skilled person. By way of example, details of one suitable PCA method is outlined in the paper: Manfred Fuchs, et al, "Improving source reconstructions by combining bioelectric and biomagnetic data", Electroencephalography and Clinical Neurophysiology, Volume 107, Issue 2, 1998, Pages 93-111. The principal component analysis procedure outlined in this paper is a singular value decomposition (SVD) method which is one example of a PCA approach. Further details on singular value decomposition (SVD) can be found for example in: https://en.wikipedia.org/wiki/Principal-_component_analysis #Singular_value_decomposition.

It has been found by the inventors that the root mean square error associated with a linear combination of just two principle component LUTs derived from a PCA procedure applied as described was almost two orders of magnitude lower than use of just a single principle component LUT.

With reference again to the example outlined above, a material decomposition can be expressed in general as $$m_s(p_h,p_l,c)=F_s(p_h,p_l,c)$$

$$m_p(p_h,p_l,c)=F_p(p_h,p_l,c)$$

where $m_s$ and $m_p$ represent the Compton Scatter and photoelectric effect line integrals. As discussed above, decomposition can also be performed into specific material contributions. The functions, $F_s$ and $F_p$ represent decomposition lookup tables (LUTs) which map projection data values, $p_h$, $p_l$, into the material data $m_s$ and $m_p$. The LUTs $F_s$ and $F_p$ are pre-computed for mapping projection data values to material values for an assumed fixed value of each the X-ray source parameters (e.g. tube current).

For each of a series of possible fixed values of a particular X-ray source parameter, there may be at least one different pre-computed decomposition LUT, $F_a$, where a represents or indexes the value of the X-ray source parameter.

For a predicted range of variation, $\Delta a$, of the X-ray source parameter over an acquisition period, a PCA procedure can be applied to reduce the set of different LUTs, $F_a$, to a set of principal component LUTs, $F_{\Delta a}$. Preferably the set of principal component LUTs is a pair of principal component LUTs, $F_{\Delta a,1}$, $F_{\Delta a,2}$. These may be pre-computed using a PCA procedure applied for each of a plurality of different ranges, $\Delta a$, of the X-ray source parameter, resulting in a plurality of sets of basis LUTs, $F_{\Delta a}$, for different possible ranges of the X-ray source parameter. These sets may be stored in the datastore 22 as the sets of first LUTs (or basis LUTs) referred to previously, and each associated in the datastore with the respective range of values, $\Delta a$, of the X-ray source parameter to which it corresponds.

The output of the PCA procedure is not only the principal component LUTs, $F_{Aa}$, but also weighting functions, w(a), for each of the principal component LUTs. The weighting functions are dependent upon an instantaneous value of the X-ray source parameter a. The weighting functions derived for a given parameter value range, Δa, may be stored in the datastore 22 in addition to the set of basis LUTs for the parameter range.

In operation of the method 10, the weighting coefficients for the LUTs forming the linear combination may be output as the weighting functions retrieved from the table. When executing the material decomposition itself, using the linear combination, the weighting coefficients at each time point of the CT projection data stream may be determined based on each instantaneous value of the X-ray source parameter at that time.

By way of more detailed explanation, a PCA algorithm in general processes a set of input channels and provides as an output a set of output channels, which are formed of respective linear combinations of the input channels. The PCA may output a vector of the output channels. In the context of embodiments of the present invention, the input channels are the decomposition LUTs, $F_a$, for mapping projection data acquired with respective fixed values, a, of the X-ray source parameter. The output channels are the reduced set of basis LUTs to be used for the linear combinations in the material decomposition.

In preferred examples, the principal component analysis (PCA) comprises a singular value decomposition (SVD) procedure. SVD is an example of a PCA procedure. As noted above, a suitable a SVD procedure for application for embodiments of the present invention is outlined in the paper: Manfred Fuchs, et al, "Improving source reconstructions by combining bioelectric and biomagnetic data", Electroencephalography and Clinical Neurophysiology, Volume 107, Issue 2, 1998, Pages 93-111.

In vector/matrix form, an SVD procedure computes $$A = U\Sigma V^*$$

with A being a matrix with n rows and m columns containing as row-vectors the LUTs, with n being the number of different values of the X-ray source parameter over the particular parameter range, and m being the number of entries in each LUT, i.e. the number of different input projection data values that the LUT in each row can map to corresponding material values. In the present case n<<m and the rank of M is n. What is sought as an output from the SVD is a low-rank approximation, A', of A. A low rank approximation means that A' has rank n'<<n (for instance n'=2). Specifically, the matrix A may be written as $$A = \begin{pmatrix} a_{11} & a_{12} & a_{13} & a_{14} & a_{15} & \cdots & a_{1m} \\ a_{21} & a_{22} & a_{23} & a_{24} & a_{25} & \cdots & a_{2m} \\ a_{31} & a_{32} & a_{33} & a_{34} & a_{35} & \cdots & a_{3m} \\ \vdots & & & & & & \vdots \\ a_{n1} & a_{n2} & a_{n3} & a_{n4} & a_{n5} & \cdots & a_{nm} \end{pmatrix} = U\Sigma V^* = \begin{pmatrix} u_{11} & u_{12} & u_{13} & \cdots & u_{1n} \\ u_{21} & u_{22} & u_{23} & \cdots & u_{2n} \\ u_{31} & u_{32} & u_{33} & & u_{3n} \\ \vdots & & & \ddots & \vdots \\ u_{n1} & u_{n2} & u_{n3} & \cdots & u_{nn} \end{pmatrix} \begin{pmatrix} \sigma_1 & 0 & 0 & 0 & 0 \\ 0 & \sigma_2 & 0 & 0 & 0 \\ 0 & 0 & \sigma_3 & 0 & 0 \\ 0 & 0 & 0 & \ddots & 0 \\ 0 & 0 & 0 & 0 & \sigma_n \end{pmatrix} \begin{pmatrix} v^*_{11} & v^*_{12} & v^*_{13} & v^*_{14} & v^*_{15} & \cdots & v^*_{1m} \\ v^*_{21} & v^*_{22} & v^*_{23} & v^*_{24} & v^*_{25} & \cdots & v^*_{2m} \\ v^*_{31} & v^*_{32} & & & & \cdots & v^*_{3m} \\ \vdots & & & & & & \vdots \\ v^*_{n1} & v^*_{n2} & v^*_{n3} & v^*_{n4} & v^*_{n5} & \cdots & v^*_{nm} \end{pmatrix}$$

where the usual convention applies that the singular values $\sigma_1, \sigma_2, \ldots, \sigma_n$ are all positive and ordered $\sigma_1 \geq \sigma_2 \geq \sigma_3 \ldots \geq \sigma_n$. The low-rank approximation is obtained by setting small singular values to 0. For instance, if seeking an approximation of rank 2, all $\sigma_i$, i>2, are set to 0 and the following is obtained $$A' = \begin{pmatrix} a'_{11} & a'_{12} & a'_{13} & a'_{14} & a'_{15} & \cdots & a'_{1m} \\ a'_{21} & a'_{22} & a'_{23} & a'_{24} & a'_{25} & \cdots & a'_{2m} \\ a'_{31} & a'_{32} & a'_{33} & a'_{34} & a'_{35} & \cdots & a'_{3m} \\ \vdots & & & & & \ddots & \vdots \\ a'_{n1} & a'_{n2} & a'_{n3} & a'_{n4} & a'_{n5} & \cdots & a'_{nm} \end{pmatrix} =$$

$$\begin{pmatrix} u_{11} & u_{12} & u_{13} & \cdots & u_{1n} \\ u_{21} & u_{22} & u_{23} & \cdots & u_{2n} \\ u_{31} & u_{32} & u_{33} & & u_{3n} \\ \vdots & & & \ddots & \vdots \\ u_{n1} & u_{n2} & u_{n3} & \cdots & u_{nn} \end{pmatrix} \begin{pmatrix} \sigma_1 & 0 & 0 & 0 & 0 \\ 0 & \sigma_2 & 0 & 0 & 0 \\ 0 & 0 & 0 & 0 & 0 \\ 0 & 0 & 0 & \ddots & 0 \\ 0 & 0 & 0 & 0 & 0 \end{pmatrix}$$

$$\begin{pmatrix} v^*_{11} & v^*_{12} & v^*_{13} & v^*_{14} & v^*_{15} & \cdots & v^*_{1m} \\ v^*_{21} & v^*_{22} & v^*_{23} & v^*_{24} & v^*_{25} & \cdots & v^*_{2m} \\ v^*_{31} & v^*_{32} & & & & \cdots & v^*_{3m} \\ \vdots & & & & & \ddots & \vdots \\ v^*_{n1} & v^*_{n2} & v^*_{n3} & v^*_{n4} & v^*_{n5} & \cdots & v^*_{nm} \end{pmatrix} = \begin{pmatrix} u_{11} & u_{12} & u_{13} & \cdots & u_{1n} \\ u_{21} & u_{22} & u_{23} & \cdots & u_{2n} \\ u_{31} & u_{32} & u_{33} & & u_{3n} \\ \vdots & & & \ddots & \vdots \\ u_{n1} & u_{n2} & u_{n3} & \cdots & u_{nn} \end{pmatrix}$$

$$\begin{pmatrix} \sigma_1 v^*_{11} & \sigma_1 v^*_{12} & \sigma_1 v^*_{13} & \sigma_1 v^*_{14} & \sigma_1 v^*_{15} & \cdots & \sigma_1 v^*_{1m} \\ \sigma_2 v^*_{21} & \sigma_2 v^*_{22} & \sigma_2 v^*_{23} & \sigma_2 v^*_{24} & \sigma_2 v^*_{25} & \cdots & \sigma_2 v^*_{2m} \\ 0 & 0 & 0 & 0 & 0 & \cdots & 0 \\ \vdots & & & & & & \vdots \\ 0 & 0 & 0 & 0 & 0 & 0 & 0 \end{pmatrix} =$$

$$\begin{pmatrix} u_{11} & u_{12} \\ u_{21} & u_{22} \\ u_{31} & u_{32} \\ \vdots & \vdots \\ u_{n1} & u_{n2} \end{pmatrix} \begin{pmatrix} \sigma_1 v^*_{11} & \sigma_1 v^*_{12} & \sigma_1 v^*_{13} & \sigma_1 v^*_{14} & \sigma_1 v^*_{15} & \cdots & \sigma_1 v^*_{1m} \\ \sigma_2 v^*_{21} & \sigma_2 v^*_{22} & \sigma_2 v^*_{23} & \sigma_2 v^*_{24} & \sigma_2 v^*_{25} & \cdots & \sigma_2 v^*_{2m} \end{pmatrix}$$

The row vectors of the right matrix (containing the elements $\sigma_i v_{ij}^*$) can be interpreted as new LUTs, which are linearly combined (with weights $u_{j1}$, $u_{j2}$) in order to get the approximated LUT for the jth source parameter.

FIG. 2 and FIG. 3 illustrate results of application of an example PCA procedure to a set of LUTs, $F_a$, for fixed values of the X-ray source parameter, a, which span a particular range Δa. It is possible to configure the SVD procedure to reduce the set of single-value LUTs $F_a$ spanning a particular range Δa to different numbers of principal components.

It has been found by the inventors that the root mean square error associated with a linear combination of just two principle component LUTs was almost two orders of magnitude lower than use of just a single principle component LUT. This is illustrated schematically in FIG. 2 which shows the root mean square error associated with the PCA procedure reduced from $\delta_1 = 0.6\%$ for a PCA deriving one principal component LUT to $\delta_2 = 0.0018\%$ for a PCA deriving two principal component LUTs. Thereafter, the drop in the error is smaller. Thus, use of at least two principal component LUTs is sufficient to achieve a very good approximation of the 'true' decomposition function for projection data with a time-variant value of the X-ray source parameter.

FIG. 3 shows the weighting coefficients (y-axis), also derived from the principal component analysis, that should be used to combine the two principal component (basis) LUTs for a desired X-ray source parameter (x-axis).

In particular, FIG. 3 shows a graphical representation of the compressed matrix U, where gray dots represent the first column vector $(u_{11}, u_{21}, u_{31}, \ldots, u_{n1})^T$ and black squares represent the second column vector $(u_{12}, u_{22}, u_{32}, \ldots, u_{n2})^T$.

It is noted that the above procedure is configured for a discrete number of source parameter values. However, since the LUTs change slowly with the source parameter, an approximation to the LUT for any value of the source parameter inside the interval Da may be obtained by interpolation between rows of the matrix U.

Figure 4:
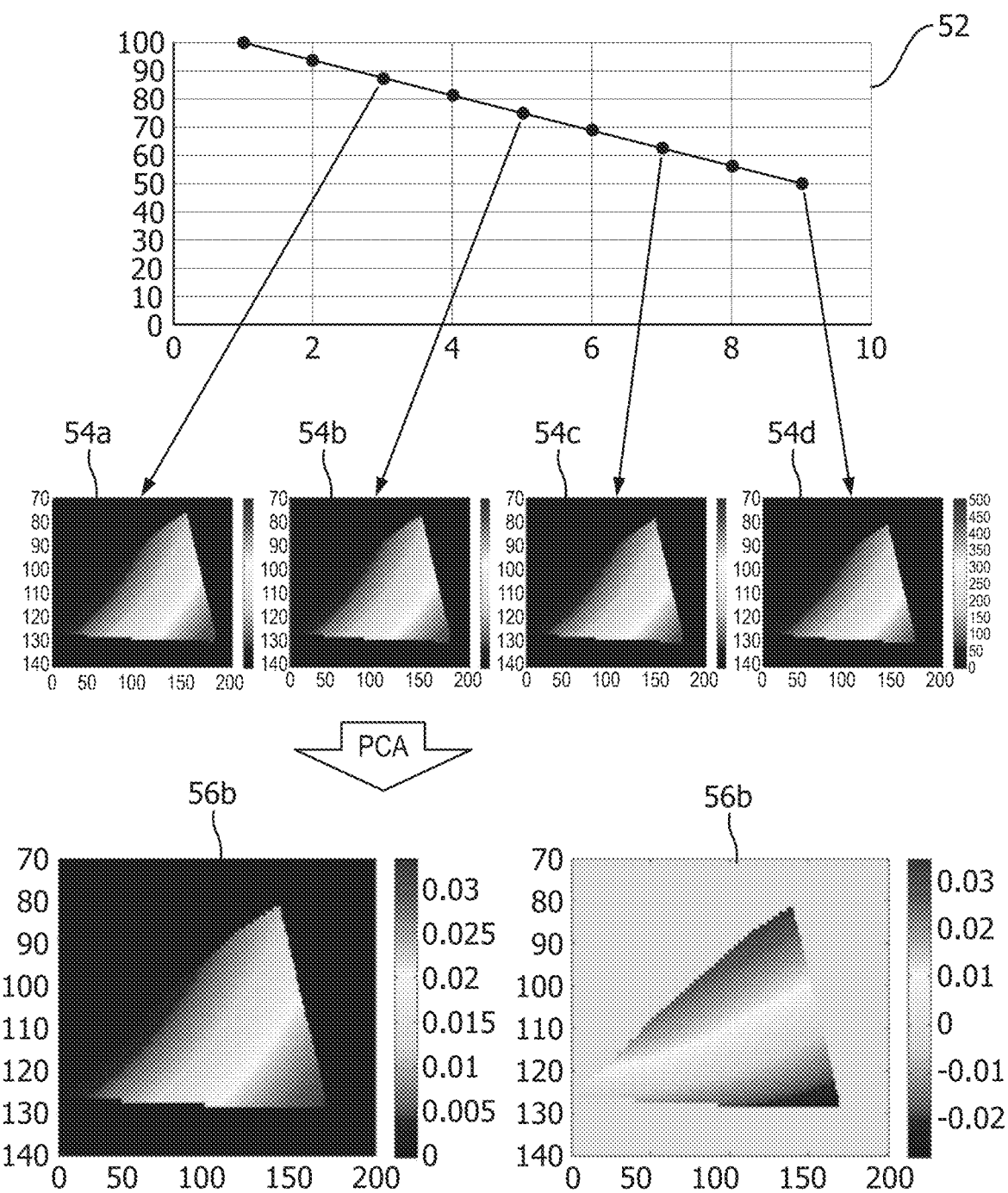
FIG. 4 illustrates application of an example PCA procedure for deriving a set of principal component LUTs.

FIG. 4 illustrates application of the PCA procedure to a set of initial LUTs 54, each initial LUT 54 defining a mapping from CT projection data values to corresponding material data values, and wherein each initial LUT is configured for mapping projection data acquired with a different respective fixed value of a defined X-ray source parameter. In the illustrated example, an arbitrary X-ray source parameter has been defined for purposes of illustration which varies between values of 1 and 9. This might correspond for example to a tube current ranging from 100% to 50%. This is illustrated by a graph 52 which shows the set of nine different settings for the arbitrary X-ray source parameter as points on the graph, where the x-axis represents the value of the arbitrary parameter, and the y-axis represents the value of the corresponding tube current, in percent. FIG. 4 shows graphical illustrations of four of the initial LUTs 54 for an example selection of four of the possible X-ray source parameter values. The graphical illustrations of the LUTs are in the form of color-chart triangles (grey-scale only illustration shown in FIG. 4). These effectively each provide a two-dimensional visualization of one of the one-dimensional row vectors of matrix A described above. The x and y axes of the color charts 54 correspond to each of the two projection data values $p_h$, $p_l$ discussed above and the color at each point in the chart (in the full-color version) represents the material data value which the two projection data values aligned with that point map to.

FIG. 4 further shows an example of a resulting two principal component LUTs 56a, 56b derived from application of a PCA procedure to the set of nine initial LUTs spanning the nine different values of the arbitrary X-ray source parameter. The two resulting principal component LUTs are each formed of a linear combination of the initial LUTs 54 and represent the best two basis LUTs for use in forming a subsequent linear combination of LUTs to use for material decomposition applied to projection data obtained from a CT apparatus for which the arbitrary X-ray source parameter had a range of variation over the course of the acquisition of from 1-9.

A further aspect of the invention may provide a method for initially generating the set of basis LUTs for each of the different possible ranges for the X-ray source parameter.

Figure 5:
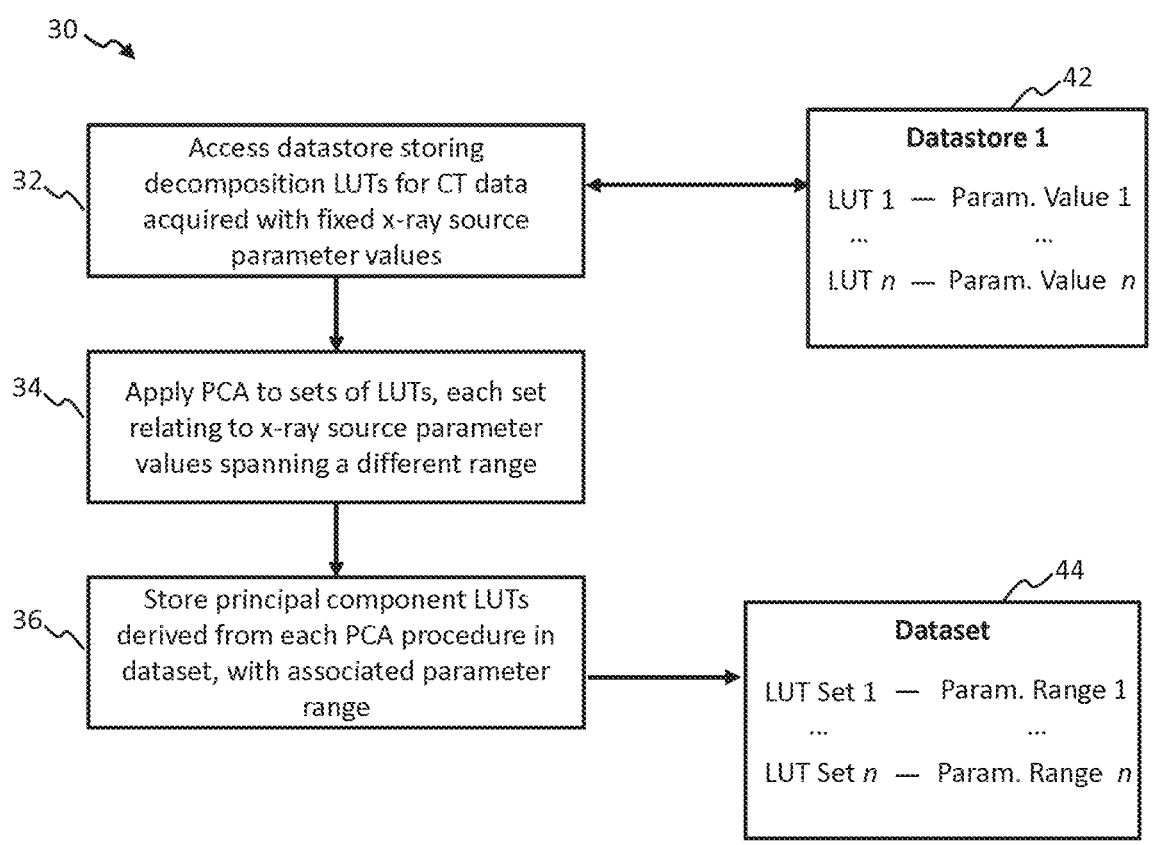
FIG. 5 is a block diagram of steps of an example method according to a further aspect of the invention.

One example method 30 according to one or more embodiments is outlined in block diagram form in FIG. 5. The shown method is for generating a dataset for use in a material decomposition procedure, the material decomposition for application to a set of input dual-energy CT projection data (e.g. kVp switching projection data) acquired over a scan period. The material decomposition procedure is one which comprises applying a linear combination of at least two LUTs to CT projection data values to obtain material data values. The method 30 according to this aspect of the invention is for generating a dataset 44 of basis LUTs for use in forming said linear combinations.

The method 30 comprises accessing 32 a further datastore 42 storing a set of further LUTs, each defining a mapping from CT projection data values to corresponding material data values, and wherein each of the plurality of further LUTs in the datastore is configured for mapping projection data acquired with a different single value of said defined X-ray source parameter.

The method 30 further comprises performing 34, for each of one or more different ranges of said X-ray source parameter, a principal component analysis (PCA) procedure, wherein the inputs to the PCA are an identified subset of the further LUTs in the further datastore corresponding to X-ray source parameter values which fall within the respective range of values, and wherein the PCA is configured to provide an output of a set of at least two principal component LUTs.

The method 30 further comprises generating 36 a dataset 44 comprising a record of each of the sets of principal component LUTs derived from the PCA procedure, and the associated range of values of the X-ray source parameter to which it corresponds.

Details relating to the implementation of the PCA procedure have been outlined above.

In accordance with one or more embodiments, the PCA procedure may be performed iteratively, and wherein the procedure comprises application of an iterative reweighted least squares algorithm, wherein a result of a PCA algorithm applied in each iteration is used to solve a weighted least squares problem. In particular, and as explained above, the linear combination of the derived principal component (basis) LUTs for a given material decomposition provides an approximation of the 'true' material decomposition result which would be achieved were the time-varying tube spectrum fully represented. The PCA seeks to minimize the root-mean-square (RMS) error of the approximation.

One approach is to use a singular value decomposition (SVD) approach (discussed above).

In one further set of examples, a minimization criterion that may be used is the p-norm ($1 \leq p < \infty$). For p>2, the resulting approximation has a smaller maximum error than that provided by the SVD. One approach to achieving this is to use an iteratively re-weighted least squares method. This can provide for higher accuracy material decomposition for small line integrals.

In accordance with one or more embodiments, the PCA procedure may include one or more pre-processing steps to increase accuracy of the resulting principal component LUTs in estimating the material values for small input projection data values. Starting with the set of the initial LUTs configured for X-ray source parameter values which fall within a particular range of values, the steps may comprise first calculating a mean LUT from the set of LUTs for the particular X-ray source parameter range. The steps further comprise normalizing each of the set of LUTs (i.e. the row vectors of the matrix A discussed above) by the mean LUT. The steps further comprise applying the PCA procedure, preferably in the form of an SVD procedure to derive the reduced set of principal component LUTs (the basis LUTs). The steps further comprise reversing the normalization of the resulting principal component LUTs by means of multiplication with the previously computed mean LUT.

This effectively reduces the error relative to the mean, and makes the resulting set of principal component LUTs more accurate for small projection data values.

Although use of a PCA procedure has been described in detailed examples above, use of PCA is not essential. A different method might be used in further examples to derive basis LUTs to be used for forming the linear combinations used in the material decompositions, for example independent component analysis.

Examples in accordance with a further aspect of the invention provide a processing arrangement adapted to perform a method in accordance with any of the embodiments outlined above or described below, or as defined in any of claim of this application.

The processing arrangement may comprise a communication module (or input/output). In some embodiments, the processing arrangement may be adapted to communicate with a CT scanning apparatus using the communication module, and adapted to receive input dual-energy CT data. In other examples, the input CT data may be received from a local or remote datastore.

In some examples, the processing arrangement may comprise the datastore which is accessed in order to define the linear combination of basis lookup tables.

The processing arrangement may be further adapted to receive the set of dual-energy CT projection data as an input, and perform a material decomposition procedure comprising application of said linear combination of LUTs to the received projection data.

Examples in accordance with a further aspect of the invention also provide a computer program product comprising computer program code, the computer program code being executable on a processor or computer, wherein the code is configured to cause the processor to perform a method in accordance with any example or embodiment outlined above or described below, or in accordance with any claim of this application.

Certain embodiments of the invention described above employ a processing arrangement. The processing arrangement may in general comprise a single processor or a plurality of processors. It may be located in a single containing device, structure or unit, or it may be distributed between a plurality of different devices, structures or units. Reference therefore to the processing arrangement being adapted or configured to perform a particular step or task may correspond to that step or task being performed by any one or more of a plurality of processing components, either alone or in combination. The skilled person will understand how such a distributed processing arrangement can be implemented. The processing arrangement includes a communication module or input/output for receiving data and outputting data to further components.

The one or more processors of the processing arrangement can be implemented in numerous ways, with software and/or hardware, to perform the various functions required. A processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A computer-implemented method for use in a material decomposition, the method comprising:
   obtaining range of an X-ray source parameter over a CT scan period in dual energy computed tomography (CT) projection data;
   accessing a datastore for storing one or more sets of lookup tables (LUTs), each LUT defining a mapping from CT projection data values to corresponding material data values, wherein each set in the datastore is associated with a respective range of the X-ray source parameter;
   selecting a set of the LUTs in the datastore based on the obtained range for the X-ray source parameter;
   defining a linear combination of the selected LUTs, wherein the weightings for each LUT in the linear combination are dependent on instantaneous values of the X-ray source parameter over the scan period; and
   generating a data output representative of the defined linear combination.

2. The method as claimed in claim 1, further comprising:
   receiving the dual-energy CT projection data as an input;
   performing the material decomposition comprising application of the linear combination of LUTs to the received dual-energy CT projection data.

3. The method as claimed in claim 1, wherein the LUTs in the datastore represent results of a principal component analysis (PCA) procedure applied in advance to one or more sets of further LUTs, each further LUT for mapping the CT projection data values acquired with a respective fixed value of the X-ray source parameter to corresponding material data values, and each of the one or more sets of further LUTs including further LUTs spanning a different respective range of values of the X-ray source parameter.

4. The method as claimed in claim 3, wherein the datastore further stores a respective weighting function associated with each first LUT, the weighting function defining the weighting coefficient to apply to the LUT in any linear combination, and the weighting function being dependent upon an instantaneous value of the X-ray source parameter at a given time point in the scan period.

5. The method as claimed in claim 4, wherein each weighting function represents a further output of the same PCA procedure of which the corresponding LUT in the datastore is an output.

6. The method as claimed in claim 1, wherein the linear combination comprises a first and second set of weighting coefficients applied to each of the two or more LUTs forming the linear combination, wherein the first set of weighting coefficients is dependent upon the instantaneous value of the X-ray source parameter at a given time point in the scan period, and the second set of weighting coefficients is determined based on a further input.

7. The method as claimed in claim 1, wherein the X-ray source parameter is at least one of an X-ray dose, an X-ray tube current, and an X-ray tube voltage.

8. A medical processing device for use in a material decomposition procedure, the device comprising:
   a memory that stores a plurality of instructions; and
      a processor coupled to the memory and configured to execute the plurality of instructions to:
         obtain range of an X-ray source parameter over a CT scan period in dual energy computed tomography (CT) projection data;
         access a datastore for storing a one or more sets of lookup tables, each LUT defining a mapping from CT projection data values to corresponding material data values, wherein each set in the datastore is associated with a respective range of the X-ray source parameter;
         select a set of the LUTs in the datastore based on the obtained range for the X-ray source parameter;
         define a linear combination of the selected LUTs, wherein the weightings for each LUT in the linear combination are dependent on instantaneous values of the X-ray source parameter over the scan period;
         generate a data output representative of the defined linear combination.

9. A non-transitory computer-readable medium for storing executable instructions, which cause a method to be performed for use in a material decomposition procedure, the method comprising:
   obtaining a range of an X-ray source parameter over a CT scan period in dual energy computed tomography (CT) projection data;
   accessing a datastore for storing one or more sets of lookup tables (LUTs), each LUT defining a mapping from CT projection data values to corresponding material data values, wherein each set in the datastore is associated with a respective range of the X-ray source parameter;
   selecting a set of the LUTs in the datastore based on the obtained range for the X-ray source parameter;
   defining a linear combination of the selected LUTs, wherein the weightings for each LUT in the linear combination are dependent on instantaneous values of the X-ray source parameter over the scan period; and
   generating a data output representative of the defined linear combination.

* * * * *